United States Patent
Tanaka et al.

(10) Patent No.: US 9,945,306 B2
(45) Date of Patent: Apr. 17, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Satoru Tanaka, Odawara (JP); Ryutaro Moriguchi, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/300,393

(22) PCT Filed: May 15, 2015

(86) PCT No.: PCT/JP2015/002469
§ 371 (c)(1),
(2) Date: Sep. 29, 2016

(87) PCT Pub. No.: WO2015/182055
PCT Pub. Date: Dec. 3, 2015

(65) Prior Publication Data
US 2017/0138280 A1  May 18, 2017

(30) Foreign Application Priority Data

May 26, 2014 (JP) .................................. 2014-108534
Apr. 2, 2015 (JP) .................................. 2015-076114

(51) Int. Cl.
*F02D 41/00* (2006.01)
*F02D 9/08* (2006.01)
(Continued)

(52) U.S. Cl.
CPC ........... *F02D 41/0007* (2013.01); *F02D 9/08* (2013.01); *F02D 13/0234* (2013.01);
(Continued)

(58) Field of Classification Search
CPC ............. F02D 41/0002; F02D 41/0007; F02D 41/2422; F02D 41/2416; F02D 41/26;
(Continued)

(56) References Cited

U.S. PATENT DOCUMENTS 6,016,460 A * 1/2000 Olin .................... F02D 41/0072
701/102
6,574,956 B1 * 6/2003 Moraal .................. F01N 9/002
123/568.18

(Continued)

FOREIGN PATENT DOCUMENTS

JP    2004-211590 A    7/2004
JP    2007-211747 A    8/2007

*Primary Examiner* — Thomas Moulis
(74) *Attorney, Agent, or Firm* — Sughrue Mion, PLLC (57) ABSTRACT

There is provided an art of performing correction of a coefficient in a model calculation formula of an intake valve model that is applied to an internal combustion engine including a turbocharger, in a wide engine operation region. An amendment value α of a map value a in a correction value calculating operation region is calculated (step 10), and a straight line expressing a relation of a turbocharging pressure Pcmp and a cylinder air filling rate KL is calculated (step S14). A point ($Pcmp_n$, $KL_n$) on the calculated straight line is specified (step S16), and correction of the map value a is performed (step S18). Thereby, a correction value a' of the map value a in an operation region that differs in the turbocharging pressure Pcmp from the correction value calculating operation region is calculated. Similarly, the correction value a' of the map value a in an operation region that differs in valve opening timing EXVT from the correction value calculating operation region, and the correction value a' of the map value a in an operation region that differs in an engine speed NE from the correction value calculating operation region are calculated (steps S20 and S22).

6 Claims, 8 Drawing Sheets

(51) Int. Cl.
  *F02D 13/02* (2006.01)
  *F02D 41/24* (2006.01)
  *F02D 41/26* (2006.01)
  *F02M 35/10* (2006.01)

(52) U.S. Cl.
  CPC ..... *F02D 41/0002* (2013.01); *F02D 41/2422* (2013.01); *F02D 41/26* (2013.01); *F02M 35/10091* (2013.01); *F02M 35/10386* (2013.01); *F02D 2200/0402* (2013.01); *F02D 2200/0406* (2013.01); *Y02T 10/144* (2013.01); *Y02T 10/18* (2013.01); *Y02T 10/42* (2013.01)

(58) Field of Classification Search
  CPC ..... F02D 2200/0402; F02D 2200/0404; F02D 2200/0406; F02D 2200/0408
  See application file for complete search history.

(56) References Cited

U.S. PATENT DOCUMENTS

| | | | |
|---|---|---|---|
| 2005/0154526 A1* | 7/2005 | Aono | F02D 41/18 701/115 |
| 2005/0246090 A1* | 11/2005 | Dingl | F02D 41/18 701/102 |
| 2008/0149081 A1* | 6/2008 | Allain | F02D 41/021 123/568.21 |
| 2008/0245070 A1* | 10/2008 | Allain | F02D 23/02 60/605.2 |
| 2009/0018756 A1* | 1/2009 | Storhok | F02D 41/0007 701/105 |
| 2012/0173118 A1* | 7/2012 | Wang | F02D 41/0002 701/102 |
| 2013/0080024 A1* | 3/2013 | Chi | F02D 28/00 701/102 |
| 2014/0000573 A1* | 1/2014 | Hu | F02D 41/0007 123/568.19 |
| 2014/0174413 A1* | 6/2014 | Huang | F02B 47/08 123/568.18 |
| 2015/0345412 A1* | 12/2015 | Conte | F02M 26/05 701/102 |
| 2016/0003175 A1* | 1/2016 | Saito | F02D 41/1475 60/603 |
| 2016/0160771 A1* | 6/2016 | Wang | F02B 33/40 123/564 |

* cited by examiner

S10: CALUCULATE AMENDMENT VALUE α OF MAP VALUE a
S12: DATA OF AMENDMENT VALUE α ARE TWO POINTS OR MORE?
S14: CALCULATE STRAIGHT LINE EXPRESSING RELATION OF
     Pcmp AND KL (CHARACTERISTIC LINE OF CHARACTERISTIC 1)
S16: SPECIFY POINT (Pcmpn, KLn) ON CHARACTERISTIC LINE
     OF CHARACTERISTIC 1
S18: CORRECT MAP VALUE a (Pcmp)
S20: CORRECT MAP VALUE a (EXVT)
S22: CORRECT MAP VALUE a (NE)

CONTROL DEVICE FOR INTERNAL COMBUSTION ENGINE

CROSS REFERENCE TO RELATED APPLICATIONS

This application is a National Stage of International Application No. PCT/JP2015/002469 filed May 15, 2015, claiming priority based on Japanese Patent Application No. 2014-108534 filed May 26, 2014 and 2015-076114 filed Apr. 2, 2015, the contents of all of which are incorporated herein by reference in their entirety.

FIELD

The present invention relates to a control device for an internal combustion engine, and particularly relates to a control device for an internal combustion engine including a turbocharger.

BACKGROUND

Conventionally, there has been disclosed a method for correcting a coefficient of a model calculation formula of an intake valve model expressing a relation of an intake pipe pressure at a downstream side of a throttle valve and a cylinder intake air flow rate, based on comparison of an actual measurement value of an operation parameter which is measured during an operation of an internal combustion engine and an estimated value of the operation parameter calculated by using the model calculation formula, in Patent Literature 1, for example. The intake valve model configures a part of an air model for estimating a cylinder filling air amount, and therefore, if the coefficient of the model calculation formula of the intake valve model can be corrected, not only the cylinder intake air flow rate but also the cylinder filling air amount can be estimated with high precision.

CITATION LIST

Patent Literature

PTL 1: Japanese Patent Laid-Open No. 2007-211747
PTL 2: Japanese Patent Laid-Open No. 2004-211590

SUMMARY

Technical Problem

Incidentally, correction of the coefficient of the above described model calculation formula is performed by unit of an engine operation region that is specified by valve opening timing of the intake valve and an engine speed. Therefore, correction is frequently performed in an operation region which is frequently used, whereas in an operation region which is temporarily used at a time of a transitional operation, an influence of noise which is superimposed on the actual measurement value of the above described operation parameter is large, and precision of correction is reduced. Therefore, there arises the problem that correction is not performed in the operation region which is used at the time of a transitional operation, and a level difference occurs to correction between the operation region which is used at the time of a transitional operation and the operation region which is frequently used. When a level difference in correction occurs, a level difference occurs to the estimated value of the cylinder intake air flow rate, whereby a trouble such as a torque variation occurs and drivability is likely to be worsened.

Further, the coefficient of the above described model calculation formula is not set with a turbocharging pressure taken into consideration. However, when the above described model calculation formula is applied to an internal combustion engine including a turbocharger, the turbocharging pressure exerts an influence on the intake pipe pressure, and therefore, the coefficient of the above described model calculation formula needs to be set not only with the valve opening timing of the intake valve and the engine speed, but also with the turbocharging pressure being added. In that way, correction of the coefficient of the above described model calculation formula also needs to be performed by an engine operation region unit including the turbocharging pressure, and occurrence of the aforementioned trouble becomes remarkable.

The present invention is made to solve the problem as described above, and has an object to provide an art of performing correction of a coefficient of a model calculation formula of an intake valve model which is applied to an internal combustion engine including a turbocharger in a wide engine operation region.

Solution to Problem

In order to solve the aforementioned problem, a first invention is a control device for an internal combustion engine that is applied to an internal combustion engine including an intake valve with variable valve opening timing, a throttle valve, and a turbocharger, and estimates a cylinder intake air flow rate by using an intake valve model expressing a relation of an intake pipe pressure at a downstream side of the throttle valve and the cylinder intake air flow rate, wherein in a model calculation formula of the intake valve model, a coefficient is used that is specified based on data in a map that is set by being related to the valve opening timing of the intake valve, an engine speed and a turbocharging pressure, the control device including approximate expression calculating means for approximating, to a first linear function, a relation of the intake pipe pressure and the cylinder intake air flow rate that is established in common in at least two engine operation regions in which an opening degree of the throttle valve is fully opened, and the valve opening timings of the intake valve and the engine speeds are the same but the turbocharging pressures are different, and turbocharging pressure axis data correcting means for correcting data in the map corresponding to an engine operation region that differs in the turbocharging pressure from at least the two engine operation regions, based on the first linear function.

A second invention is such that, in the first invention, the data in the map has, as initial data, a gradient and a y-intercept of a second linear function expressing a relation of an intake pipe pressure and a cylinder intake air flow rate that is established when the opening degree of the throttle valve is changed under a condition in which the valve opening timing of the intake valve, the engine speed and the turbocharging pressure are fixed, and the turbocharging pressure axis data correcting means calculates a value of a gradient of a straight line that passes through a coordinate point which is a coordinate point on a straight line expressing the first linear function, and has a turbocharging pressure which is different from the turbocharging pressures of at least the two engine operation regions, set to an x-coordinate, and a coordinate point of the y-intercept corresponding to an engine operation region that is specified by the different turbocharging pressure, and updates data of the gradient of the second linear function based on the calculated value of the gradient.

A third invention is such that, in the first or the second invention, the control device further includes engine speed axis data correcting means for correcting data in the map corresponding to an engine operation region that differs in the engine speed from at least the two engine operation regions, based on the first linear function.

A fourth invention is such that, in the third invention, the data in the map has, as initial data, a gradient and a y-intercept of a second linear function expressing a relation of an intake pipe pressure and a cylinder intake air flow rate that is established when the opening degree of the throttle valve is changed under a condition in which the valve opening timing of the intake valve, the engine speed and the turbocharging pressure are fixed, and the engine speed axis data correcting means calculates a value of a gradient of a straight line that passes through a coordinate point which is a coordinate point on a straight line expressing the first linear function, and has the same turbocharging pressure as the turbocharging pressure of the engine operation region, which is selected from at least the two engine operation regions, set to an x-coordinate, and a coordinate point of the y-intercept corresponding to an engine operation region that is the same in the valve opening timing of the intake valve as the selected engine operation region and differs in the engine speed from the selected engine operation region, and updates data of the gradient of the second linear function based on the calculated value of the gradient.

A fifth invention is such that, in any one of the first to the fourth inventions, the internal combustion engine further includes an exhaust valve with variable valve opening timing, the first linear function is a relation of the intake pipe pressure and the cylinder intake air flow rate that is established in common in at least two engine operation regions in which the opening degree of the throttle valve is fully opened, and the valve opening timings of the intake valve, the valve opening timings of the exhaust valve and the engine speeds are the same but the turbocharging pressures differ, and the control device further includes exhaust valve timing axis data correcting means for correcting data in the map corresponding to an engine operation region which differs in the valve opening timing of the exhaust valve from at least the two engine operation regions, based on the first linear function.

A sixth invention is such that, in the fifth invention, the data in the map has, as initial data, a gradient and a y-intercept of a second linear function expressing a relation of an intake pipe pressure and a cylinder intake air flow rate that is established when the opening degree of the throttle valve is changed under a condition in which the valve opening timing of the intake valve, the valve opening timing of the exhaust valve, the engine speed and the turbocharging pressure are fixed, and the exhaust valve timing axis data correcting means calculates a value of a gradient of a straight line that passes through a coordinate point which is a coordinate point on a straight line expressing the first linear function, and has a same turbocharging pressure as the turbocharging pressure of the engine operation region, which is selected from at least the two engine operation regions, set to an x-coordinate, and a coordinate point of the y-intercept corresponding to an engine operation region that is the same in the valve opening timing of the intake valve and the engine speed as the selected engine operation region and differs in the valve opening timing of the exhaust valve from the selected engine operation region, and updates data of the gradient of the second linear function based on the calculated value of the gradient.

Advantageous Effects of Invention

When the opening degree of the throttle valve is fully opened, the relation of the turbocharging pressure and the cylinder intake air amount is expressed by the first linear function. According to the first invention, the relation of the intake pipe pressure and the cylinder intake air flow rate that is established in common in at least two engine operation regions in which the opening degree of the throttle valve is fully opened, and the valve opening timings of the intake valve and the engine speeds are the same but the turbocharging pressures are different is approximated to the first linear function, and based on the first linear function, the map data corresponding to the engine operation region that differs in the turbocharging pressure from at least the two engine operation regions can be corrected. That is to say, correction of a coefficient of the model calculation formula of the intake valve model the coefficient of which is specified based on the data in the map which is set by being related to the valve opening timing of the intake valve, the engine speed and the turbocharging pressure can be performed in a wide turbocharging pressure region.

According to the second invention, when the gradient of the second linear function expressing the relation of the intake pipe pressure and the cylinder intake air flow rate that is established when the opening degree of the throttle valve is changed under the condition in which the valve opening timing of the intake valve, the engine speed and the turbocharging pressure are fixed is set as the initial data, not only the data corresponding to at least the two engine operation regions described above, but also the data corresponding to the engine operation region which differs in the turbocharging pressure from at least the two engine operation regions described above can be updated.

According to the third invention, the map data corresponding to the engine operation region which differs in the engine speed from at least the two engine operation regions described above can be corrected. That is to say, correction of the coefficient of the model calculation formula of the intake valve model can be performed in a wide engine speed region.

According to the fourth invention, when the gradient of the second linear function expressing the relation of the intake pipe pressure and the cylinder intake air flow rate that is established when the opening degree of the throttle valve is changed under the condition in which the valve opening timing of the intake valve, the engine speed and the turbocharging pressure are fixed is set as the initial data, not only the data corresponding to at least the two engine operation regions described above, but also the data corresponding to the engine operation region which is the same in the valve opening timing of the intake valve and the turbocharging pressure as the engine operation region selected from at least the two engine operation regions described above, and differs in the engine speed from the selected engine operation region can be updated.

According to the fifth invention, the map data corresponding to the engine operation region which differs in the valve opening timing of the exhaust valve from at least the two engine operation regions described above can be corrected. That is to say, correction of the coefficient of the model calculation formula in the intake valve model can be performed in a wide exhaust valve opening timing region.

According to the sixth invention, when the gradient of the second linear function expressing the relation of the intake pipe pressure and the cylinder intake air flow rate that is established when the opening degree of the throttle valve is changed under the condition in which the valve opening timing of the intake valve, the valve opening timing of the exhaust valve, the engine speed and the turbocharging pressure are fixed is set as the initial data, not only the data corresponding to at least the two engine operation regions described above, but also the data corresponding to the engine operation region which is the same in the valve opening timing of the intake valve, the engine speed and the turbocharging pressure as the engine operation region selected from at least the two engine operation regions described above, and differs in the valve opening timing of the exhaust valve from the selected engine operation region can be updated.

DESCRIPTION OF EMBODIMENTS

Hereinafter, an embodiment of the present invention will be described based on the drawings. Note that common elements in the respective drawings will be assigned with the same reference signs and redundant explanation will be omitted. Further, the present invention is not limited by the following embodiment.

Figure 1:
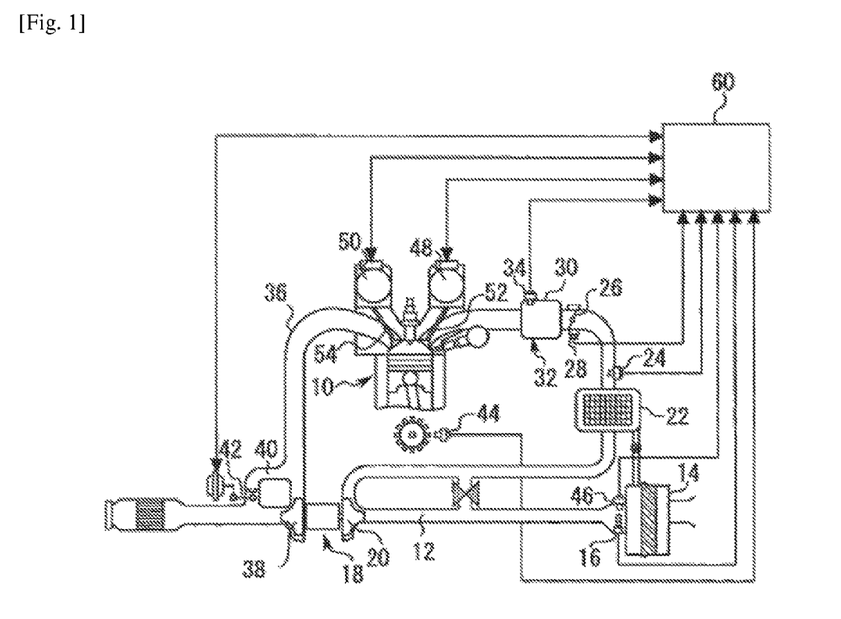
FIG. 1 is a schematic diagram showing a configuration of an internal combustion engine that is controlled by a control device of a present embodiment.

FIG. 1 is a schematic diagram showing a configuration of an internal combustion engine which is controlled by a control device of the present embodiment. As shown in FIG. 1, an internal combustion engine 10 is configured as a spark-ignition type engine which is loaded on a vehicle. However, the internal combustion engine 10 may be a compression ignition type engine, and is not specially limited to the number of cylinders and arrangement of the cylinders of the internal combustion engine 10.

An air cleaner 14 is provided at a most upstream portion of an intake pipe 12 (an intake passage) of the internal combustion engine 10. An air flow meter 16 that detects an intake air amount and an intake air temperature is provided at a downstream side of the air cleaner 14. A compressor 20 for a turbocharger 18, and an intercooler 22 that cools the intake air which is compressed by the compressor 20 are provided at a downstream side of the air flow meter 16. A turbocharging pressure sensor 24 that detects an intake air pressure at an upstream side of a throttle valve 26 is provided at a downstream side of the intercooler 22. The throttle valve 26, and a throttle opening degree sensor 28 that detects an opening degree (hereinafter, called "a throttle opening degree") TA of the throttle valve 26 are provided at a downstream side of the turbocharging pressure sensor 24. A surge tank 30 is provided at a downstream side of the throttle valve 26. The surge tank 30 is provided with an intake pipe pressure sensor 34 that detects a pressure (hereinafter, called "an intake manifold pressure") Pm of an intake pipe section 32 at the downstream side of the throttle valve 26.

An exhaust pipe 36 (an exhaust passage) of the internal combustion engine 10 is provided with an exhaust turbine 38 which is connected to the compressor 20. The turbocharger 18 is configured to turbocharge intake air by rotationally driving the compressor 20 by rotationally driving the exhaust turbine 38 with kinetic energy of an exhaust gas. The exhaust pipe 36 is provided with an exhaust bypass passage 40 that bypasses an upstream side and a downstream side of the exhaust turbine 38. A wastegate valve (WGV) 42 that opens and closes the exhaust bypass passage 40 is provided halfway through the exhaust bypass passage 40.

The control device of the present embodiment is realized as a part of a function of an ECU (Electronic Control Unit) 60 that controls the internal combustion engine 10. The ECU 60 includes a RAM (Random Access Memory), a ROM (Read Only Memory), a CPU (microprocessor) and the like. Information from various sensors such as a crank angle sensor 44 that detects an engine speed NE, and an atmospheric pressure sensor 46 that detects an atmospheric pressure Pa in addition to the air flow meter 16, the turbocharging pressure sensor 24, the throttle opening degree sensor 28 and the intake pipe pressure sensor 34 which are described above is inputted to the ECU 60. The ECU 60 operates actuators of the internal combustion engine 10 based on the information thereof, and controls an operation of the internal combustion engine 10 by the operation of the actuators. The actuators operated by the ECU 60 include a variable intake valve mechanism 48 and a variable exhaust valve mechanism 50 for driving an intake valve 52 and an exhaust valve 54 respectively and the like, in addition to the throttle valve 26 and the WGV 42 which are described above.

Figure 2:
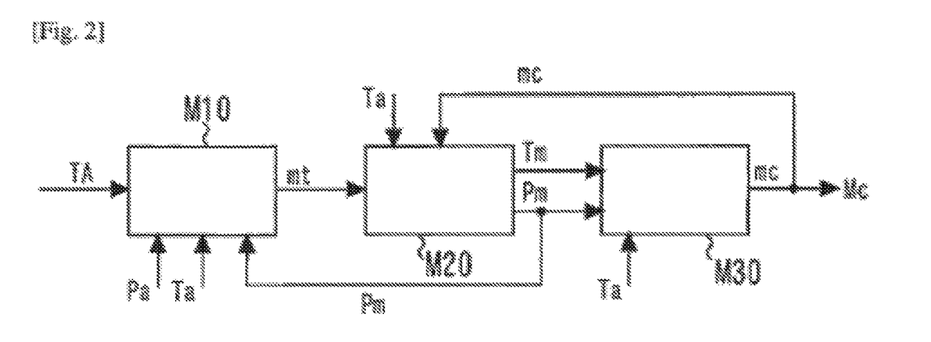
FIG. 2 is a block diagram showing a configuration of an ECU 60 when attention is paid to estimation of a cylinder filling air amount Mc.

The ECU 60 as the control device estimates an amount of air (hereinafter, called "a cylinder filling air amount MC") which fills the cylinder of the internal combustion engine 10 when the intake valve 52 is closed by the variable intake valve mechanism 48. The cylinder filling air amount Mc is a parameter that is used in torque control and air-fuel ratio control of the internal combustion engine 10, and is estimated by an air model. FIG. 2 is a block diagram showing a configuration of the ECU 60 at a time of attention being paid to estimation of the cylinder filling air amount Mc. As shown in FIG. 2, the ECU 60 is configured by an air model including a throttle model M10, an intake pipe model M20 and an intake valve model M30. The configuration shown in FIG. 2 is a configuration that is virtually realized by the CPU operating in accordance with a program that is stored in the ROM of the ECU 60.

The throttle model M10 is a calculation model expressing a relation of the throttle opening degree TA, and a flow rate of air passing through the throttle valve 26 per unit time (hereinafter, called "a throttle passing air flow rate") mt by a mathematical expression. The throttle opening degree TA which is detected by the throttle opening degree sensor 28, an atmospheric pressure (or a pressure of air taken into the intake pipe 12) Pa around the internal combustion engine which is detected by the atmospheric pressure sensor 46, an atmospheric temperature (or a temperature of the air taken into the intake pipe 12) Ta around the internal combustion engine which is detected by the air flow meter 16, and the intake manifold pressure Pm which is calculated in the intake pipe model M20 which will be described later are inputted to the throttle model M10. Values of these input parameters are substituted into a model calculation formula of the throttle model M10, whereby the throttle passing air flow rate mt is calculated. The calculated throttle passing air flow rate mt is inputted to the intake pipe model M20.

The intake pipe model M20 is a calculation model expressing a relation of the throttle passing air flow rate mt and a flow amount of air that flows into the cylinder of the internal combustion engine 10 per unit time (hereinafter, called "a cylinder intake air flow rate") mc, and the intake manifold pressure Pm by a mathematical expression. The throttle passing air flow rate mt which is calculated in the throttle model M10 and the cylinder intake air flow rate mc are inputted to the intake pipe model M20. Values of these input parameters are substituted into a model calculation formula of the intake pipe model M20, whereby the intake manifold pressure Pm and an intake pipe internal temperature Tm of the intake pipe section 32 are calculated. The intake manifold pressure Pm and the intake pipe internal temperature Tm which are calculated are both inputted to the intake valve model M30. The calculated intake manifold pressure Pm is also inputted to the throttle model M10.

The intake valve model M30 is a calculation model expressing a relation of the intake manifold pressure Pm and the cylinder intake air flow rate mc by a mathematical expression. The intake manifold pressure Pm which is calculated in the intake pipe model M20, the intake pipe internal temperature Tm and the atmospheric temperature Ta are inputted to the intake valve model M30. Values of these input parameters are substituted into a model calculation formula of the intake valve model M30, whereby the cylinder intake air flow rate mc is calculated. The calculated cylinder intake air flow rate mc is converted into the cylinder filling air amount Mc. For example, when the internal combustion engine 10 is a four-stroke in-line four-cylinder engine, the cylinder intake air flow rate mc is converted into the cylinder filling air amount Mc by multiplying the cylinder intake air flow rate mc by a time period $\Delta 180°$ that is necessary for a crankshaft to rotate 180° C. (namely, an angle obtained by dividing an angle of 720° by which the crankshaft rotates during one cycle by the number of cylinders) (Mc=mc×$\Delta$T180°). The calculated cylinder intake air flow rate mc is also inputted to the intake pipe model M20.

Note that a cylinder air filling rate KL that will be described later is calculated by dividing the cylinder filling air amount Mc by a mass of air that constitutes a capacity corresponding to an exhaust amount per cylinder in a state under 1 atm at 25° C. As above, the cylinder filling air amount Mc, the cylinder intake air flow rate mc, and the cylinder air filling rate KL are in proportion to one another. Further, the model calculation formulas themselves of the throttle model M10, the intake pipe model M20 and the intake valve model M30 are known as disclosed in Japanese Patent Laid-Open No. 2007-211747 and Japanese Patent Laid-Open No. 2004-211590, for example.

In the present embodiment, the ECU 60 is programmed to perform calculation of a correction value a' of a map value a of the model calculation formula in the above described intake valve model M30, and correction of the map value a by the calculated correction value a' on line (that is, in parallel with calculation of the cylinder filling air amount Mc using the above described air model and the like). Hereinafter, a correction method of the map value a will be described. First, the model calculation formula of the intake valve model M30 will be described. The model calculation formula is expressed by expression (1) as follows.

[Math. 1]

$$mc = \frac{Ta}{Tm} \cdot (a \cdot Pm - b) \tag{1}$$

Values a and b shown in expression (1) change in accordance with valve opening timing INVT of the intake valve 52, valve opening timing EXVT of the exhaust valve 54, an engine speed NE and a turbocharging pressure Pcmp. These values a and b are adapted in advance based on a physical characteristic (a second characteristic that will be described later) that the cylinder air filling rate KL is proportional to the intake manifold pressure Pm when the throttle opening degree TA is changed under a condition in which the valve opening timing INVT, the valve opening timing EXVT, the engine speed NE and the turbocharging pressure Pcmp are fixed (hereinafter, called "an INVT/EXVT/NE/Pcmp fixed condition"). More specifically, the intake manifold pressure Pm is measured first by changing the throttle opening degree TA under the INVT/EXVT/NE/Pcmp fixed condition, and the cylinder air filling rate KL at this time is calculated. Subsequently, a linear function of the cylinder air filling rate KL with the intake manifold pressure Pm as a variable is obtained, based on the measured intake manifold pressure Pm and the calculated cylinder air filling rate KL. A gradient of the obtained linear function is set as an initial value of the value a, and an intercept is set as an initial value of the value b. The initial values (initial data) of the values a and b are stored in the ECU 60 in a format of a four-dimensional map that is related to the valve opening timing INVT, the valve opening timing EXVT, the engine speed NE and the turbocharging pressure Pcmp at the time of adaptation. Note that as the initial values of the values a and b, average values that are calculated after the above described linear function is obtained a plurality of times are desirably used.

Figure 3:
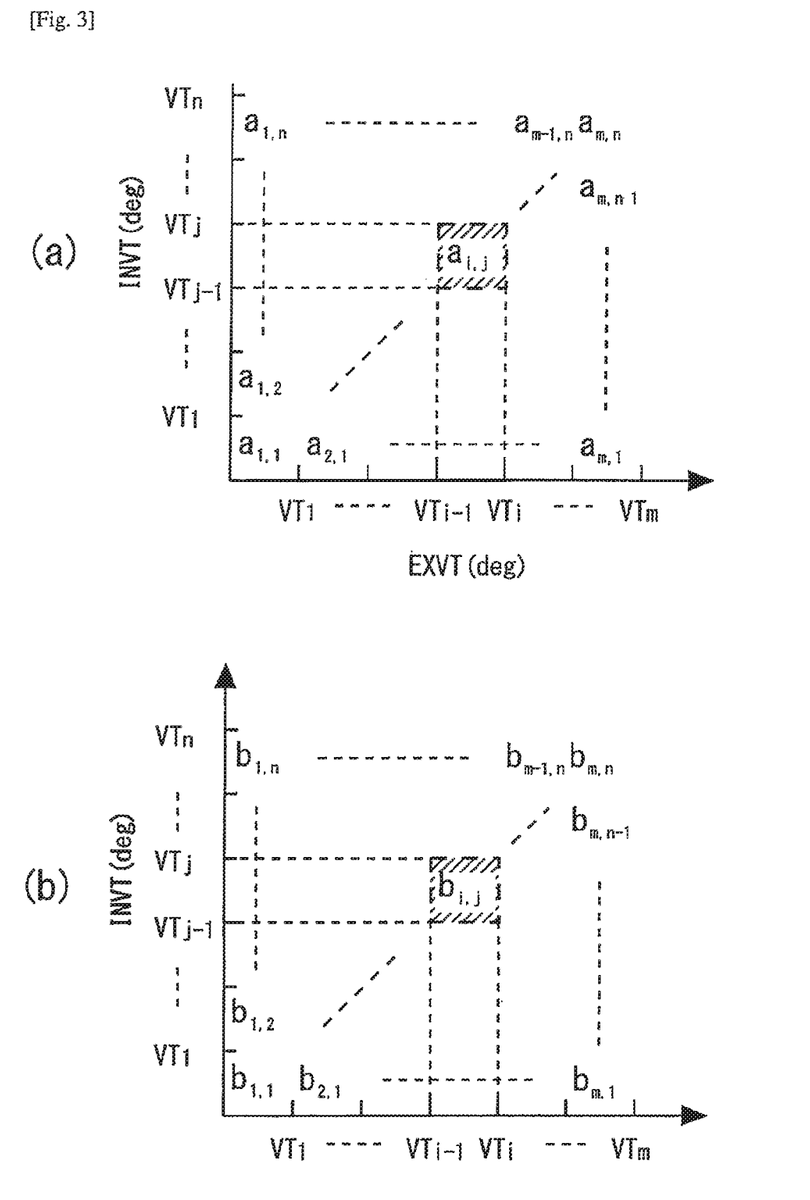
FIG. 3 is a diagram showing maps of values a and b.

FIG. 3 shows maps of the values a and b. FIG. 3 (a) shows a relation of the valve opening timing INVT and the valve opening timing EXVT and the value a, and FIG. 3 (b) shows a relation of the valve opening timing INVT and the valve opening timing EXVT and the value b, respectively. As shown in FIG. 3, the values a and b are set for each of regions into which the valve opening timing INVT and the valve opening timing EXVT are divided at fixed intervals. For example, data of regions $a_{i,j}$, and $b_{i,j}$ shown in FIG. 3 correspond to data of the values a and b at a time of the valve opening timing EXVT being located between $VT_{i-1}$ and $VT_i$, and the valve opening timing INVT being located between $VT_{j-1}$ and $VT_j$, respectively.

The maps in FIG. 3 are illustration of maps that specify the relation of the valve opening timing INVT and the valve opening timing EXVT in the arbitrary engine speed NE and the arbitrary turbocharging pressure Pcmp. That is to say, in the ECU 60, the maps of the values a and b shown in FIG. 3 are stored for each engine speed NE and each turbocharging pressure Pcmp. Further, in the maps of the values a and b, the engine speed NE and the turbocharging pressure Pcmp are divided at fixed intervals similarly to the valve opening timing INVT and the valve opening timing EXVT. As above, the values a and b are specified based on data in the maps of the values a and b corresponding to an operation region (NE, INVT, EXVT, Pcmp) that is defined by the combination of the engine speed NE, the valve opening timing INVT, the valve opening timing EXVT and the turbocharging pressure Pcmp.

Figure 4:
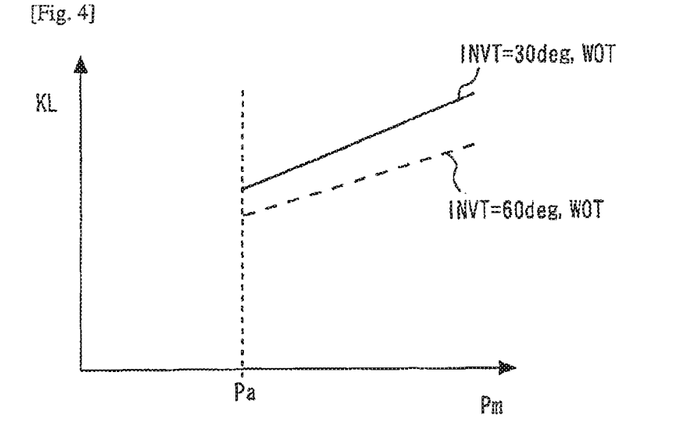
FIG. 4 is a diagram for explaining a first characteristic to be a precondition of correction of a model calculation formula of an intake valve model M30.

Subsequently, a physical characteristic to be a precondition of correction of the model calculation formula of the intake valve model M30 will be described. A first characteristic (hereinafter, called "characteristic 1") is a characteristic that when an opening degree of the WGV 42, that is, an exhaust pressure is changed under a condition that the throttle opening degree TA is fully opened (WOT) (hereinafter called "a TA full opening condition"), and a condition in which the valve opening timing INVT and the engine speed NE are fixed (hereinafter, called "an INVT/NE fixed condition"), the relation of the cylinder air filling rate KL and the intake manifold pressure Pm is expressed by a linear function and does not depend on the valve opening timing EXVT. FIG. 4 is a diagram for explaining characteristic 1. Two characteristic lines (a solid line and a broken line) shown in FIG. 4 differ from each other in the valve opening timing INVT. Further, the horizontal axis in FIG. 4 shows a time average value of the intake manifold pressure Pm that pulsates, and an actual value of the intake manifold pressure Pm deviates slightly from the time average value as a matter of course. A difference (a deviation amount) of these values significantly depends on the engine speed NE. Like this, the relation of the cylinder air filling rate KL and the intake manifold pressure Pm depends on the valve opening timing INVT and the engine speed NE. However, when both of them are fixed, the relation of the cylinder air filling rate KL and the intake manifold pressure Pm (>the atmospheric pressure Pa) is expressed by a linear function as is understandable from the two characteristic lines shown in FIG. 4.

Characteristic 1 is based on a state equation of a gas that is established in the cylinder at a closing time of the intake valve. That is to say, when the state equation of the gas is organized with respect to a gas mass M, expression (2) as follows is obtained.

[Math. 2]

$$M = \frac{Pc \cdot Vc}{R \cdot Tc} \quad (2)$$

In expression (2), Pc represents a pressure in the cylinder at the closing time of the intake valve, and can be regarded as the intake manifold pressure Pm. Further, Vc shown in expression (2) represents a cylinder internal capacity at the closing time of the intake valve, and is fixed under an INVT/NE fixed condition. Further, Tc shown in expression (2) represents a cylinder internal temperature at the closing time of the intake valve, and is substantially equal to an engine water temperature and fixed. In addition to this, there is no pressure difference in intake air and exhaust gas in the TA full opening condition, and therefore, a blowback amount of a burned gas can be substantially ignored. Thereby, the valve opening timing EXVT which is related to the blowback amount can be also ignored. Thereby, most of the gas mass M can be considered as a fresh air amount, and it can be found out that the relation of the gas mass M and the intake manifold pressure Pm corresponds to a linear function, and does not depend on the valve opening timing EXVT. Since the gas mass M is correlated with the cylinder air filling rate KL, characteristic 1 is derived.

The second characteristic (hereinafter, called "characteristic 2") is the characteristic that when the throttle opening degree TA is changed under the INVT/EXVT/NE/Pcmp fixed condition, the cylinder air filling rate KL is proportional to the intake manifold pressure Pm.

Figure 5:
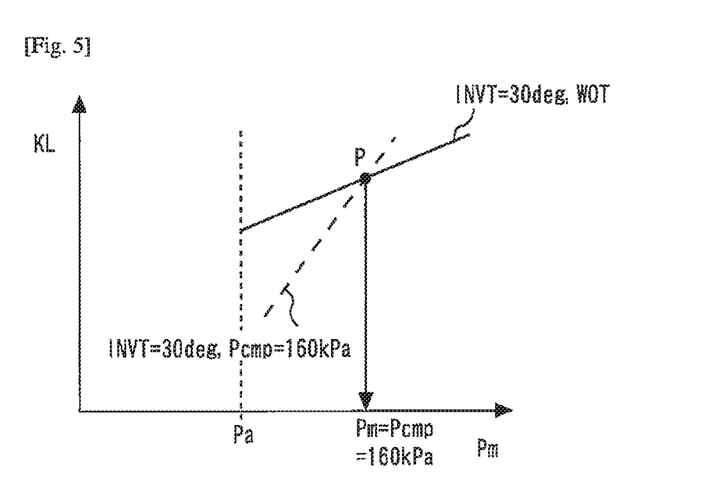
FIG. 5 is a diagram for explaining a third characteristic to be a precondition of correction of the model calculation formula of the intake valve model M30.

A third characteristic (hereinafter, called "characteristic 3") is a characteristic that the intake manifold pressure Pm at an intersection point of the characteristic line of characteristic 1 and a characteristic line of characteristic 2 under the INVT/NE fixed condition is a fixed value of the turbocharging pressure Pcmp in characteristic 2. The reason thereof is that in the TA full opening condition which is the precondition of characteristic 1, the turbocharging pressure Pcmp is equal to the intake manifold pressure Pm. FIG. 5 is a diagram for explaining characteristic 3. A solid line shown in FIG. 5 is a characteristic line corresponding to characteristic 1, and a broken line is a characteristic line corresponding to characteristic 2. An intersection point P shown in FIG. 5 is an intersection point of the characteristic line of characteristic 1 and the characteristic line of characteristic 2, and the intake manifold pressure Pm at the intersection point P is the fixed value of the turbocharging pressure Pcmp at a time of creating the characteristic line of characteristic 2.

On the precondition of the aforementioned physical characteristics, calculation of the correction value a' of the map value a, and correction of the map value a by the calculated correction value a' are performed. Calculation of the correction value a' of the map value a is performed based on an amendment value α of the map value a in the correction value calculating operation regions under the TA full opening condition (referring to at least two operation regions which are the same in the engine speed NE, the valve opening timing INVT and the valve opening timing EXVT, and differ in the turbocharging pressures Pcmp, among the above described operation regions (NE, INVT, EXVT, Pcmp). Hereinafter, the same.). For the correction value calculating operation regions, the operation regions which are frequently used during an engine operation are selected in advance. Note that in the following explanation, a combination of the engine speed NE, the valve opening timing INVT and the valve opening timing EXVT in each of the correction value calculating operation regions is (NE$_1$, INVT$_1$, EXVT$_1$) for convenience.

Figure 6:
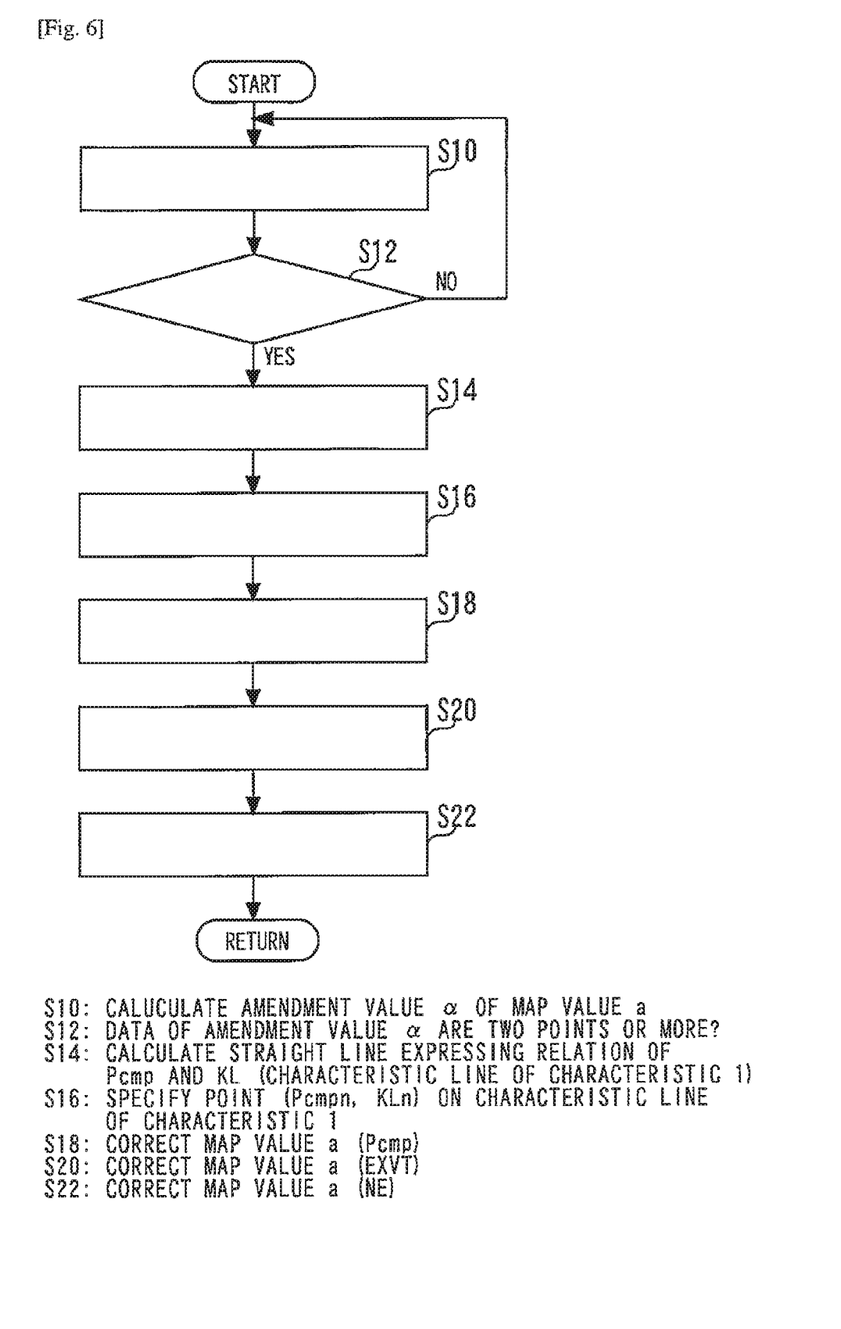
FIG. 6 is a flowchart for explaining an operation of correction which is executed in the ECU 60.

FIG. 6 is a flowchart for explaining an operation of correction that is executed in the ECU 60. A routine shown in FIG. 6 is repeatedly executed at each fixed crank angle, during travel of the vehicle loaded with the internal combustion engine 10. In the routine shown in FIG. 6, the amendment value α of the map value a in the correction value calculating operation region is calculated first (step 10). The amendment value α is calculated as a ratio of a value of energy of a gas that flows out of the intake pipe section 32 (that is, a value that is calculated based on the law of conservation of energy of the intake pipe section 32), and a value of the energy of the gas which is calculated by using the intake valve model M30, while the engine speed NE, the valve opening timing INVT and the valve opening timing EXVT indicate the values (NE$_1$, INVT$_1$, EXVT$_1$) in the correction value calculating operation region, under the TA full opening condition, and more specifically, the amendment value α is expressed by expression (3) as follows.

[Math. 3]

$$a = \frac{\int_{t_0}^{t_1} mt\, dt - \frac{(Pmr(t_1) - Pmr(t_0)) \cdot V_m}{\kappa \cdot T \cdot Ta}}{\int_{t_0}^{t_1}(a \cdot Pmr - b)\, dt} \quad (3)$$

In expression (3), $t_0$ and $t_1$ respectively correspond to a time point to at which the engine speed NE, the valve opening timing INVT and the valve opening timing EXVT enter the correction value calculating operation regions, and a time point $t_1$ at which the engine speed NE, the valve opening timing INVT and the valve opening timing EXVT leave the correction value calculating operation region. Further, Pmr represents an actual pressure of the intake pipe section 32 which is detected by the intake pipe pressure sensor 34, and κ represents a specific heat ratio (Cp/Cv).

Note that the amendment value α of the map value a can be calculated by other known methods without being limited to expression (3). As such known methods, the methods that are disclosed in Japanese Patent Laid-Open No. 2004-211590 and Japanese Patent Laid-Open No. 2004-263571 are cited, for example.

Here, an initial value a (NEk, INVTk, EXVTk, Pcmpk) of the maps of the values a and b (more accurately, the map of the value a) in an arbitrary operation region (NE$_k$, INVT$_k$, EXVT$_k$, Pcmp$_k$) is corrected as follows, for example. First, an amendment value αk of the corresponding operation region is calculated by using expression (3). Subsequently, the initial value a (NEk, INVTk, EXVTk, Pcmpk) is multiplied by the calculated αk. Thereby, the correction value a' (NEk, INVTk, EXVTk, Pcmpk) of the map value a is obtained. Accordingly, if the amendment value α of the map value a is calculated in all the operation regions by using expression (3), calculation of the correction value a' of the map value a and correction of the map value a by the calculated correction value a' are enabled theoretically. However, all of the operation regions are not always used. Further, in the operation region which is temporarily used at the time of a transitional operation, a calculation time period (that is, a time period from t0 to t1 in expression (3)) of the amendment value α of the map value a is insufficient, and an influence of noise which is superimposed on the parameter (namely, the intake pipe pressure Pmr in expression (3)) which is used in calculation of the amendment value α cannot be ignored.

Figure 7:
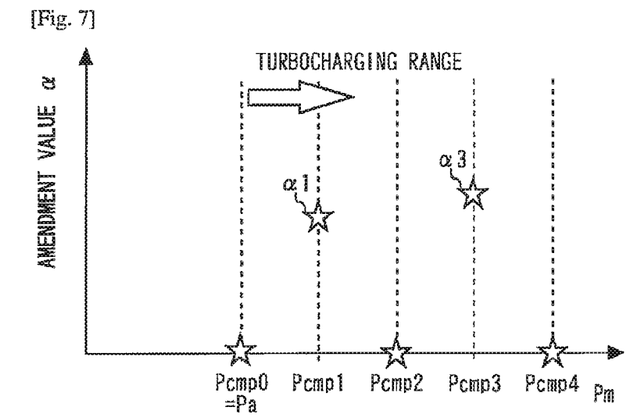
FIG. 7 is a diagram showing a relation between an amendment value α of the map value a and an intake manifold pressure Pm.

Therefore, in the present embodiment, the correction value a' of the map value a in the correction value calculating operation region is simply calculated by using the amendment value α of the map value a in the correction value calculating operation region. The combination of the engine speed NE, the valve opening timing INVT and the valve opening timing EXVT in the correction value calculating operation region is (NE$_1$, INVT$_1$, EXVT$_1$), and therefore, the amendment value α is calculated as a combination (Pcmp$_1$, α$_1$), (Pcmp$_2$, α$_2$), ... (Pcmp$_n$, α$_n$) with an arbitrary turbocharging pressure Pcmp (>the atmospheric pressure Pa) in the correction value calculating operation region. FIG. 7 is a diagram showing a relation of the amendment value α of the map value a and the intake manifold pressure Pm. In FIG. 7, the intake manifold pressures at which the amendment value α is zero (the turbocharging pressures Pcmp at which the amendment value α is on an axis of the intake manifold pressure Pm) mean that the amendment values α at the turbocharging pressures Pcmp are not calculated. That is to say, in FIG. 7, the combinations of (Pcmp$_1$, α$_1$), (Pcmp$_3$, α$_3$) are calculated.

Following step S10, when the data of the amendment value α of the map value a are two points or more (in the case of YES in step S12), a straight line expressing the relation of the turbocharging pressure Pcmp and the cylinder air filling rate KL is calculated (step S14). More specifically, based on the combinations (Pcmp$_1$, α$_1$) and (Pcmp$_3$, α$_3$) which are calculated in step S10, and expression (4) as follows, combinations (Pcmp$_1$, KL$_1$) and (Pcmp$_3$, KL$_3$) of the data of the turbocharging pressure Pcmp and the cylinder air filling rate KL are calculated first.

[Math.4]

$$KL = \alpha \cdot (a \cdot Pcmp + b) \quad (4)$$

In expression (4), a and b are data of the map value a and the map value b corresponding to the respective correction value calculating operation regions (NE$_1$, INVT$_1$, EXVT$_1$, Pcmp$_1$) and (NE$_1$, INVT$_1$, EXVT$_1$, Pcmp$_3$), and are determined based on the map stored in the ECU 60. Note that when the data of the amendment value α of the map value a is only one point in step S12 (in the case of NO in step S12), the flow returns to the processing in step S10.

Figure 8:
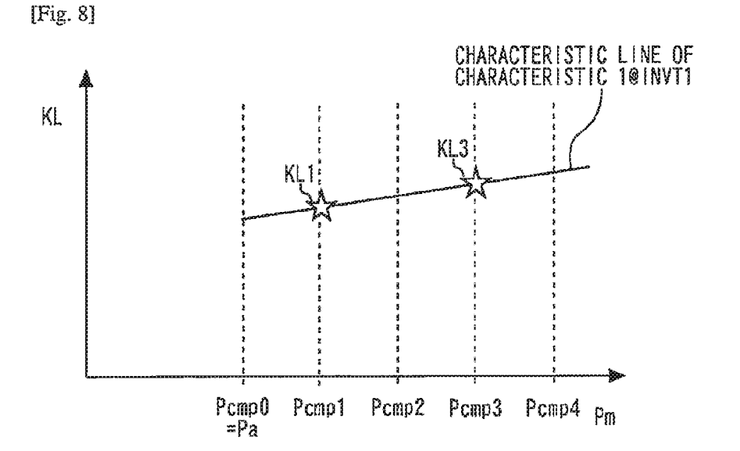
FIG. 8 is a diagram for explaining a straight line which is approximated by processing in step S14 in FIG. 6.

After calculation of (Pcmp$_1$, KL$_1$) and (Pcmp$_3$, KL$_3$), a straight line passing through the point (Pcmp$_1$, KL$_1$) and the point (Pcmp$_3$, KL$_3$) which are calculated is approximated by using a least squares method or the like. FIG. 8 is a diagram for explaining the straight line which is approximated by processing in step S14. In FIG. 8, KL$_1$ is a value of the cylinder air filling rate KL which is calculated from (Pcmp$_1$, α$_1$) and expression (4), and KL$_3$ is a value of the cylinder air filling rate KL which is calculated from (Pcmp$_3$, α$_3$) and expression (4). FIG. 8 shows the straight line which is approximated based on a data set of two points which are the point (Pcmp$_1$, KL$_1$) and the point (Pcmp$_3$, KL$_3$), but the straight line can be also approximated based on a data set of three points or more (for example, the point (Pcmp$_1$, KL$_1$), the point (Pcmp$_3$, KL$_3$), a point (Pcmp$_4$, KL$_4$), ... ).

Here, when the exhaust pressure is changed under the TA full opening condition, as described at the time of explanation of characteristic 1, the relation of the cylinder air filling rate KL and the intake manifold pressure Pm is expressed by the linear function. That is to say, when the turbocharging pressure Pcmp is changed under the TA full opening condition, the relation of the cylinder air filling rate KL and the intake manifold pressure Pm is expressed by the linear function. Further, as described at the time of explanation of characteristic 3, in the TA full opening condition, the turbocharging pressure Pcmp is equal to the intake manifold pressure Pm. Therefore, when the turbocharging pressure Pcmp is changed under the TA full opening condition, the relation of the cylinder air filling rate KL and the turbocharging pressure Pcmp is expressed by a linear function.

In regard with the above description, the point (pcmp$_1$, KL$_1$) and the point (Pcmp$_3$, KL$_3$) described above are the combinations of the turbocharging pressure Pcmp and the cylinder air filling rate KL which are calculated in the correction value calculating operation regions (NE$_1$, INVT$_1$, EXVT$_1$, Pcmp$_1$) and (NE$_1$, INVT$_1$, EXVT$_1$, Pcmp$_3$) under the TA full opening condition. Accordingly, the straight line that passes through the point (Pcmp$_1$, KL$_1$) and the point (Pcmp$_3$, KL$_3$) corresponds to the characteristic line of characteristic 1.

Figure 9:
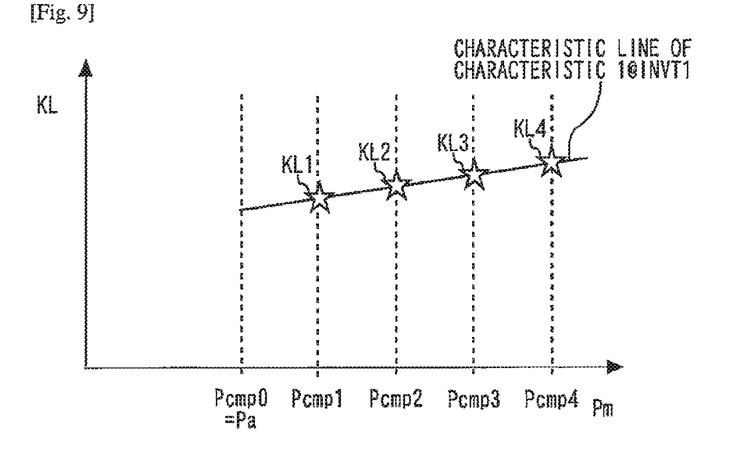
FIG. 9 is a diagram showing a point ($Pcmp_n$, $KL_n$) on a characteristic line of characteristic 1.

Following step S14, a point (Pcmp$_n$, KL$_n$) on the characteristic line of characteristic 1 which is obtained in step S14 is determined (step S16). FIG. 9 is a diagram showing the point (Pcmp$_n$, KL$_n$) on the characteristic line of characteristic 1. In the present step, points (for example, a point (Pcmp$_2$, KL$_2$), a point (Pcmp$_4$, KL$_4$), . . . ) on the characteristic line of characteristic 1 other than the point (Pcmp$_1$, KL$_1$) and the point (Pcmp$_3$, KL$_3$) are specified. As described at the time of explanation of FIG. 3, in each of the maps of the values a and b, the turbocharging pressure Pcmp is divided at fixed intervals. Therefore, the points on the characteristic line of characteristic 1 other than the point (pcmp$_1$, KL$_1$) and the point (Pcmp$_3$, KL$_3$) are specified by being caused to correspond to the division intervals of the maps of the values a and b.

Following step S16, correction of the map value a is performed based on the point (Pcmp$_n$, KL$_n$) (n≠1, 3) which is specified in step S16 (step S18). As described at the time of explanation of the values a and b, the respective map values of the maps of the values a and b which are stored in the ECU 60 are the gradient (the value a) and the intercept (the value b) of the linear function of the intake manifold pressure Pm and the cylinder air filling rate KL. That is to say, the cylinder air filling rate KL at a time of Pm in FIG. 8 and FIG. 9 being zero corresponds to the map value of the value b. With use of this, the value b is determined from the map corresponding to the operation region (NE$_1$, INVT$_1$, EXVT$_1$, Pcmp$_n$) which differs in the turbocharging pressure Pcmp from the correction value calculating operation region, and a gradient of a straight line that connects a point (0, b (NE$_1$, INVT$_1$, EXVT$_1$, Pcmp$_n$)) expressed by using the map value b and the point (Pcmp$_n$, KL$_n$) is calculated. In the present embodiment, the gradient of the straight line is set as the correction value a' of the map value a in the operation region which differs in the turbocharging pressure Pcmp from the correction value calculating operation region.

Figure 10:
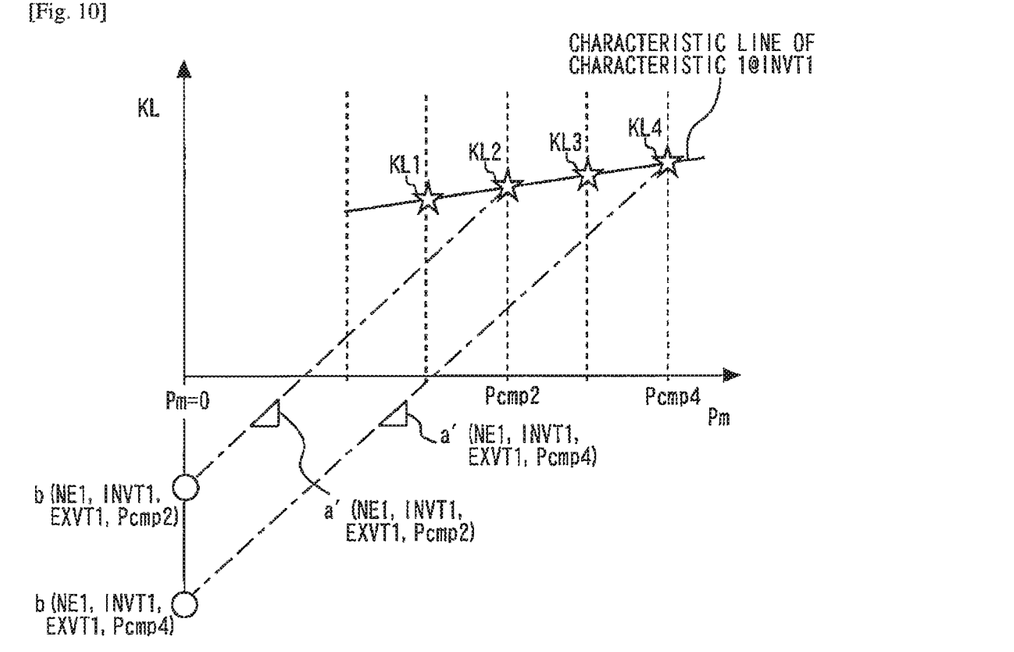
FIG. 10 is a diagram showing a correction value a' of the map value a in an operation region which is different in a turbocharging pressure Pcmp from a correction value calculating operation region.

FIG. 10 is a diagram showing the correction value a' of the map value a in an operation region that differs in the turbocharging pressure Pcmp from the correction value calculating operation region. A point (0, b (NE$_1$, INVT$_1$, EXVT$_1$, Pcmp$_2$)) shown in FIG. 10 corresponds to the data of the map value b corresponding to an operation region (NE$_1$, INVT$_1$, EXVT$_1$, Pcmp$_2$), and a point (0, b (NE$_1$, INVT$_1$, EXVT$_1$, Pcmp$_4$)) corresponds to the data of the map value b corresponding to an operation region (NE$_1$, INVT$_1$, EXVT$_1$, Pcmp$_4$). A gradient of a straight line connecting the point (0, b (NE$_1$, INVT$_1$, EXVT$_1$, Pcmp$_2$)) and the point (Pcmp$_2$, KL$_2$) corresponds to the correction value a' (NE$_1$, INVT$_1$, EXVT$_1$, Pcmp$_2$), and a gradient of a straight line connecting the point (0, b (NE$_1$, INVT$_1$, EXVT$_1$, Pcmp$_4$)) and the point (Pcmp$_4$, KL$_4$) corresponds to the correction value a' (NE$_1$, INVT$_1$, EXVT$_1$, Pcmp$_4$).

As above, according to the processing in step S18, the correction value a' of the map value a in the operation region which differs in the turbocharging pressure Pcmp from the correction value calculating operation region can be calculated based on the characteristic line of characteristic 1. The data of the calculated correction value a' is reflected in the map. Thereby, the map value a in the operation region which differs in the turbocharging pressure Pcmp from the correction value calculating operation region is corrected.

Correction of the map value a in the correction value calculating operation region (NE$_1$, INVT$_1$, EXVT$_1$, Pcmp$_1$) is performed by calculating the correction value a' by multiplying the map value a (NE$_1$, INVT$_1$, EXVT$_1$, Pcmp$_1$) by the amendment value $\alpha_1$ which is calculated in step S10, and reflecting the data of the calculated correction value a' in the map of the value a. The same applies to correction of the map value a in the correction value calculating operation region (NE$_1$, INVT$_1$, EXVT$_1$, Pcmp$_3$).

Following step S18, correction of the map value a in the operation region which differs in the valve opening timing EXVT from the correction value calculating operation region is performed (step S20). As shown in FIG. 3, the maps of the values a and b are provided for each valve opening timing EXVT. Further, as described at the time of explanation of characteristic 1, the relation of the cylinder air filling rate KL and the intake manifold pressure Pm does not depend on the valve opening timing EXVT. Accordingly, the correction values a' are also calculated by the method similar to step S18 with respect to operation regions (NE$_1$, INVT$_1$, EXVT$_2$, Pcmp$_1$), (NE$_1$, INVT$_1$, EXVT$_3$, Pcmp$_1$), . . . , (NE$_1$, INVT$_1$, EXVT$_m$, Pcmp$_1$) which differ in the valve opening timing EXVT from the correction value calculating operation region, and operation regions (NE$_1$, INVT$_1$, EXVT$_2$, Pcmp$_3$), (NE$_1$, INVT$_1$, EXVT$_3$, Pcmp$_3$), . . . , (NE$_1$, INVT$_1$, EXVT$_m$, Pcmp$_3$).

Figure 11:
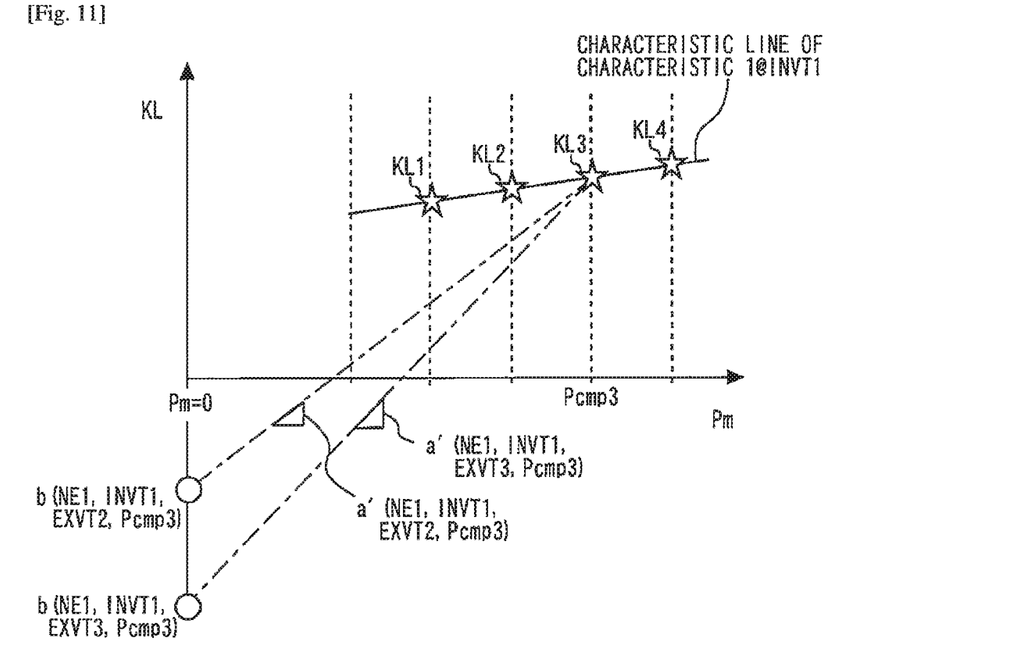
FIG. 11 is a diagram showing the correction value a' of the map value a in an operation region which is different in valve opening timing EXVT from the correction value calculating operation region.

FIG. 11 is a diagram showing the correction value a' of the map value a in an operation region that differs in the valve opening timing EXVT from the correction value calculating operation region. In FIG. 11, explanation will be made with the turbocharging pressure Pcmp$_3$ as an example. The correction value a' in the operation region (NE$_1$, INVT$_1$, EXVT$_1$, Pcmp$_3$) is already calculated, and therefore, the other operation regions (NE$_1$, INVT$_1$, EXVT$_2$, Pcmp$_3$) and (NE$_1$, INVT$_1$, EXVT$_3$, Pcmp$_3$) are calculated. A gradient of a straight line connecting a point (0, b (NE$_1$, INVT$_1$, EXVT$_2$, Pcmp$_3$)) and a point (Pcmp$_3$, KL$_3$) corresponds to the correction value a' (NE$_1$, INVT$_1$, EXVT$_2$, Pcmp$_3$) and a gradient of a straight line connecting a point (0, b (NE$_1$, INVT$_1$, EXVT$_3$, Pcmp$_3$)) and a point (Pcmp$_3$, KL$_3$) corresponds to the correction value a' (NE$_1$, INVT$_1$, EXVT$_3$, Pcmp$_3$).

As above, according to the processing in step S20, the correction value a' in the operation region which differs in the valve opening timing EXVT from the correction value calculating operation region can be calculated based on the characteristic line of characteristic 1. Data of the calculated correction value a' is reflected in the map of the value a. Thereby, the map value a in the operation region which differs in the valve opening timing EXVT from the correction value calculating operation region is corrected.

Following step S20, correction of the map value a in an operation region that differs in the engine speed NE from the correction value calculating operation region is performed (step S22). A frequency of intake pulsation in the intake pipe section 32 changes with the engine speed NE, and therefore, if the engine speed NE changes, the cylinder intake air flow rate mc also changes. However, when division intervals of the engine speed NE are finely set in the maps of the values a and b, an influence of the intake pulsation becomes small in an operation region in a vicinity of the correction value calculating operation region. Accordingly, the correction values a' are also calculated according to a method as in step S18, with respect to operation regions ($NE_2$, $INVT_1$, $EXVT_1$, $Pcmp_1$) and ($NE_3$, $INVT_1$, $EXVT_1$, $Pcmp_1$) that are the operation regions in the vicinity of the correction value calculating operation region like this and differ in the engine speed NE from the correction value calculating operation region, and operation regions ($NE_2$, $INVT_1$, $EXVT_1$, $Pcmp_3$) and ($NE_3$, $INVT_1$, $EXVT_1$, $Pcmp_3$).

Figure 12:
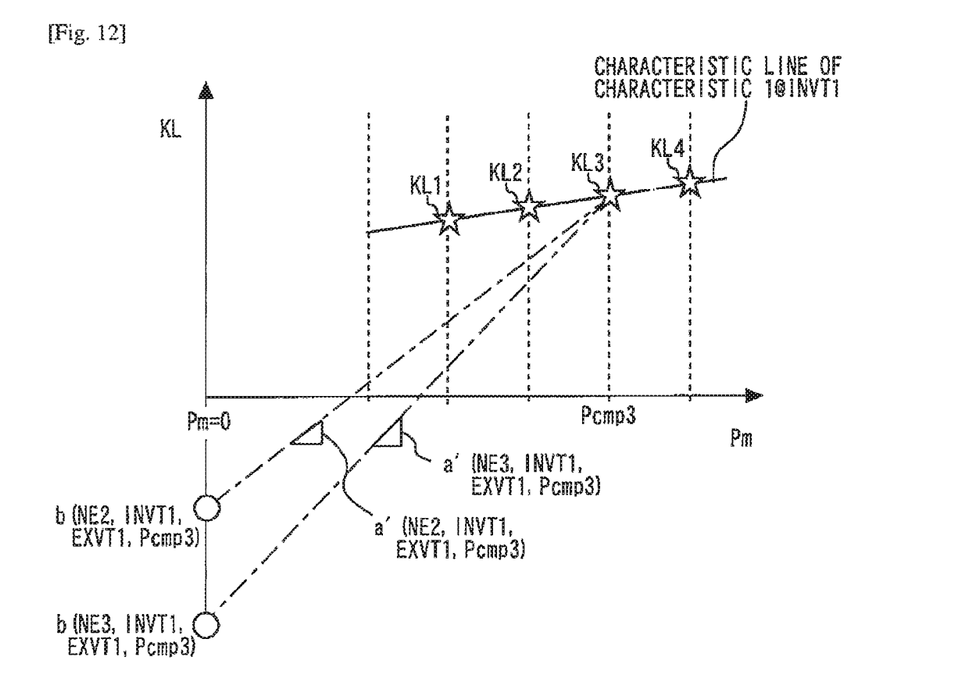
FIG. 12 is a diagram showing the correction value a' of the map value a in an operation region which is different in an engine speed NE from the correction value calculating operation region.

FIG. 12 is a diagram showing the correction values a' of the map value a in operation region that differs in the engine speed NE from the correction value calculating operation region. In FIG. 12, explanation is made with the turbocharging pressure $Pcmp_3$ as an example. The correction value a' of the operation region ($NE_1$, $INVT_1$, $EXVT_1$, $Pcmp_3$) is already calculated, and therefore, the other operation regions ($NE_2$, $INVT_1$, $EXVT_1$, $Pcmp_3$) and ($NE_3$, $INVT_1$, $EXVT_3$, $Pcmp_3$) are calculated. A gradient of a straight line connecting a point (0, b ($NE_2$, $INVT_1$, $EXVT_1$, $Pcmp_3$)) and a point ($Pcmp_3$, $KL_3$) corresponds to the correction value a' ($NE_2$, $INVT_1$, $EXVT_1$, $Pcmp_3$), and a gradient of a straight line connecting a point (0, b ($NE_3$, $INVT_1$, $EXVT_1$, $Pcmp_3$)) and a point ($Pcmp_3$, $KL_3$) corresponds to the correction value a' ($NE_3$, $INVT_1$, $EXVT_1$, $Pcmp_3$).

As above, according to the processing in step S22, the correction value a' of the operation region which differs in the engine speed NE from the correction value calculating operation region can be calculated based on the characteristic line of characteristic 1. Data of the calculated correction value a' is reflected in the map of the value a. Thereby, the map value a in the operation region which differs in the engine speed NE from the correction value calculating operation region is corrected.

As above, according to the routine shown in FIG. 6, the characteristic line of characteristic 1 is approximated based on the amendment values $\alpha_1$ and $\alpha_3$ in the correction value calculating operation regions ($NE_1$, $INVT_1$, $EXVT_1$, $Pcmp_1$) and ($NE_1$, $INVT_1$, $EXVT_1$, $Pcmp_3$) under the TA full opening condition, the correction values a' in the operation regions which differ in the turbocharging pressure Pcmp and the valve opening timing EXVT are calculated based on the characteristic line of characteristic 1, and can be reflected in the map of the value a. Further, the correction values a' in the operation regions which are according to the division intervals of the engine speed NE, are in the vicinity of the correction value calculating operation region, and differ in the engine speed NE are also calculated based on the characteristic line of characteristic 1, and can be reflected in the map of the value a. That is to say, by using the characteristic line of characteristic 1 which is approximated based on the amendment value α of the map value a in the correction value calculating operation region under the TA full opening condition, the correction values a' of the map value a in the operation regions that differ in the turbocharging pressure Pcmp, the valve opening timing EXVT and the engine speed NE from the correction value calculating operation region can be interpolated, and the uncorrected region can be decreased. That is to say, the map value a can be corrected in a wide operation region.

Note that in the above described embodiment, the characteristic line of characteristic 1 corresponds to "a first linear function" of the above described first invention. Further, "approximate expression calculating means" of the above described first invention is realized by executing the processing in steps S10 to S14 in FIG. 6, and "turbocharging pressure axis data correcting means" of the above described first invention is realized by executing the processing in steps S16 and S18 in FIG. 6, respectively.

Further, the characteristic line of characteristic 2 corresponds to "a second linear function" of the above described second invention.

Further, "engine speed axis data correcting means" of the above described third invention is realized by executing the processing in step S22 in FIG. 6.

Further, "exhaust valve timing axis data correcting means" of the above described fifth invention is realized by executing the processing in step S20 in FIG. 6.

Incidentally, in the above described embodiment, the internal combustion engine 10 includes the variable exhaust valve mechanism 50, and the valve opening timing EXVT is variable by the variable exhaust valve mechanism 50. However, the valve opening timing EXVT may be fixed. The maps of the values a and b in this case are stored in the ECU 60 in the format of the three-dimensional maps which are related to the valve opening timing INVT, the engine speed NE and the turbocharging pressure Pcmp, and therefore, data of the map value a can be corrected similarly to the above described embodiment by performing a series of processing in FIG. 6 from which step S20 is omitted.

Further, in the above described embodiment, the three pieces of processing in steps S18, S20 and S22 in FIG. 6 are executed in this sequence. However, the processing in step S22 may be omitted, and the processing in step S18 and the processing in step S20 may be executed. Similarly, the processing in step S20 and the processing in step S22 may be omitted, and only the processing in step S18 may be executed. Further, the processing in step S22 may be executed right after step S18, and thereafter, the processing in step S20 may be executed.

Further, in the above described embodiment, the method for correcting the data of the map value a which is adapted in advance based on characteristic 2 by the correction value a' which is calculated during vehicle travel is explained. However, for the data of the map value a, data of the map value a that is set based on a physical characteristic, a model and the like that differ from characteristic 2 may be used.

Further, the data of the map value a which is corrected in accordance with the correction method of the above described embodiment may be further corrected in accordance with the correction method of the above described embodiment. That is to say, the correction method of the above described embodiment may be used in updating the data of the maps of the values a and b.

Further, the data of the map value a which is corrected in accordance with the correction method of the above described embodiment may be used as the initial data of the maps of the values a and b. That is to say, the correction method of the above described embodiment may be used in adaptation of the maps of the values a and b. In this case, significant reduction of the number of steps of adaptation can be expected.

Further, in the above described embodiment, the relation of the cylinder air filling rate KL and the intake manifold pressure Pm is expressed by the linear function. However, as described above, the cylinder intake air flow rate mc and the cylinder air filling rate KL are in proportion to each other, and therefore, even when the cylinder intake air flow rate mc is used in place of the cylinder air filling rate KL in the above described embodiment, an effect similar to the effect of the above described embodiment can be obtained.

REFERENCE SIGNS LIST

10 Internal combustion engine
18 Turbocharger

26 Throttle valve
34 Intake pipe pressure sensor
44 Crank angle sensor
52 Intake valve
54 Exhaust valve
60 ECU

The invention claimed is:

1. A control device for an internal combustion engine that is applied to an internal combustion engine including an intake valve with variable valve opening timing, a throttle valve, and a turbocharger, and is configured to estimate a cylinder intake air flow rate by using an intake valve model expressing a relation of an intake pipe pressure at a downstream side of the throttle valve and the cylinder intake air flow rate,
wherein in a model calculation formula of the intake valve model, a coefficient that is specified based on data in a map that is set by being related to the valve opening timing of the intake valve, an engine speed and a turbocharging pressure, is used,
the control device is further configured to:
approximate, to a first linear function, a relation of the intake pipe pressure and the cylinder intake air flow rate that is established in common in at least two engine operation regions in which an opening degree of the throttle valve is fully opened, and the valve opening timings of the intake valve and the engine speeds are the same but the turbocharging pressures are different; and
correct data in the map corresponding to an engine operation region that differs in the turbocharging pressure from at least the two engine operation regions, based on the first linear function.

2. The control device for an internal combustion engine according to claim 1,
wherein the data in the map has, as initial data, a gradient and a y-intercept of a second linear function expressing a relation of an intake pipe pressure and a cylinder intake air flow rate that is established when the opening degree of the throttle valve is changed under a condition in which the valve opening timing of the intake valve, the engine speed and the turbocharging pressure are fixed, and
the control device-is further configured to:
calculate a value of a gradient of a straight line that passes through a coordinate point which is a coordinate point on a straight line expressing the first linear function, and has a turbocharging pressure which is different from the turbocharging pressures of at least the two engine operation regions, set to an x-coordinate, and a coordinate point of the y-intercept corresponding to an engine operation region that is specified by the different turbocharging pressure; and
update data of the gradient of the second linear function based on the calculated value of the gradient.

3. The control device for an internal combustion engine according to claim 1,
wherein the control device:
is further configured to correct data in the map corresponding to an engine operation region that differs in the engine speed from at least the two engine operation regions, based on the first linear function.

4. The control device for an internal combustion engine according to claim 3,
wherein the data in the map has, as initial data, a gradient and a y-intercept of a second linear function expressing a relation of an intake pipe pressure and a cylinder intake air flow rate that is established when the opening degree of the throttle valve is changed under a condition in which the valve opening timing of the intake valve, the engine speed and the turbocharging pressure are fixed, and
the control device-is further configured to calculate a value of a gradient of a straight line that passes through a coordinate point which is a coordinate point on the straight line expressing the first linear function, and has a same turbocharging pressure as the turbocharging pressure of the engine operation region, which is selected from at least the two engine operation regions, set to an x-coordinate, and a coordinate point of the y-intercept corresponding to an engine operation region that is the same in the valve opening timing of the intake valve as the selected engine operation region and differs in the engine speed from the selected engine operation region, and updates data of the gradient of the second linear function based on the calculated value of the gradient.

5. The control device for an internal combustion engine according to claim 1,
wherein the internal combustion engine further includes an exhaust valve with variable valve opening timing, and
the first linear function is a relation of the intake pipe pressure and the cylinder intake air flow rate that is established in common in at least two engine operation regions in which the opening degree of the throttle valve is fully opened, and the valve opening timings of the intake valve, the valve opening timings of the exhaust valve and the engine speeds are the same but the turbocharging pressures differ,
the control device
is further configured to correct data in the map corresponding to an engine operation region which differs in the valve opening timing of the exhaust valve from at least the two engine operation regions, based on the first linear function.

6. The control device for an internal combustion engine according to claim 5,
wherein the data in the map has, as initial data, a gradient and a y-intercept of a second linear function expressing a relation of an intake pipe pressure and a cylinder intake air flow rate that is established when the opening degree of the throttle valve is changed under a condition in which the valve opening timing of the intake valve, the valve opening timing of the exhaust valve, the engine speed and the turbocharging pressure are fixed, and
the control device-is further configured to:
calculate a value of a gradient of a straight line that passes through a coordinate point which is a coordinate point on a straight line expressing the first linear function, and has a same turbocharging pressure as the turbocharging pressure of the engine operation region, which is selected from at least the two engine operation regions, set to an x-coordinate, and a coordinate point of the y-intercept corresponding to an engine operation region that is the same in the valve opening timing of the intake valve and the engine speed as the selected engine operation region and differs in the valve opening timing of the exhaust valve from the selected engine operation region; and
update data of the gradient of the second linear function based on the calculated value of the gradient.

* * * * *